United States Patent
Feit et al.

(10) Patent No.: US 6,311,053 B1
(45) Date of Patent: Oct. 30, 2001

(54) CALLING PARTY PAID WIRELESS TELECOMMUNICATION SYSTEM

(75) Inventors: Susan Feit, Morganville, NJ (US); Roderick Nelson, Fall City; Jordan M. Roderick, Redmond, both of WA (US)

(73) Assignees: AT&T Corp., New York, NY (US); AT&T Wireless Services, Inc., Kirkland, WA (US)

( * ) Notice: Subject to any disclaimer, the term of this patent is extended or adjusted under 35 U.S.C. 154(b) by 0 days.

(21) Appl. No.: 09/228,646

(22) Filed: Jan. 12, 1999

Related U.S. Application Data

(60) Provisional application No. 60/072,410, filed on Jan. 23, 1998.

(51) Int. Cl.[7] .................................................. H04M 15/00
(52) U.S. Cl. .......................................... 455/406; 455/445
(58) Field of Search .......................... 455/445, 405–408; 379/114, 121

(56) References Cited

U.S. PATENT DOCUMENTS

| | | | |
|---|---|---|---|
| 5,557,664 | 9/1996 | Burns et al. | 379/114 |
| 5,890,064 | * 3/1999 | Widergen et al. | 455/445 |
| 6,169,891 | * 1/2001 | Gorham et al. | 455/408 |

* cited by examiner

*Primary Examiner*—Nguyen T. Vo

(57) ABSTRACT

A telecommunication network processes a telephone call from a calling party to a called party. The called party uses a wireless telephone that is associated with an MSC and has a MIN. The telecommunication network, responsive to the calling party dialing the MIN, receives the MIN at an originating switch. The network then translates the MIN to an internal routing number and routes the telephone call to a terminating switch based on the internal routing number. The terminating switch is directly connected to the MSC. The network then translates the internal routing number back to the MIN and routes the telephone call to the MSC. After the call is completed, the billing of the called party is suppressed for at least some of the telephone call air time.

23 Claims, 2 Drawing Sheets

CALLING PARTY PAID WIRELESS TELECOMMUNICATION SYSTEM

CROSS-REFERENCES TO RELATED APPLICATIONS

This application claims the benefit of U.S. Provisional Application No. 60/072,410, filed Jan. 23, 1998.

FIELD OF THE INVENTION

The present invention is directed to wireless telecommunication. More particularly, the present invention is directed to a calling party paid wireless telecommunication system.

BACKGROUND OF THE INVENTION

Calls placed over wireless telecommunications facilities often involve charges incurred by both the calling party and the called party. The calling party incurs conventional telecommunications charges (e.g., toll charges) associated with the call, as well as so-called "air time" charges when the calling party originates the call over wireless telecommunications facilities (e.g., a cellular telephone). The called party also will incur air time charges when using wireless telecommunications facilities, even though the called party did not originate the call. These air time charges lead people with wireless communications devices to turn off their equipment to avoid paying charges for unwanted calls. Also, prospective callers may feel inhibited to call a wireless telephone number, knowing that the called party will also be charged for the call. This reduces the utility of having the wireless communications device in the first place.

One way to increase the use of wireless telecommunications facilities is to provide a system for billing the calling party for charges associated with the called party's use of the wireless facilities. An example of such a system is disclosed in U.S. Pat. No. 5,557,664 (the "'664 patent"), assigned to AT&T Corp. In the system disclosed in the '664 patent, the calling party dials a special, non-geographic telephone number associated with the wireless subscriber. The wireless subscriber's telephone also has a separate mobile identification number ("MIN"). The system determines the MIN, and then sends the dialed number and the MIN to the wireless switch associated with the subscriber's telephone in the form of a signaling message. The signaling message indicates to the wireless switch that billing for the air time for the wireless subscriber is to be suppressed. The signaling message is disclosed in the '664 patent as a Signaling System 7 ("SS7") message.

One problem with the system disclosed in the '664 patent is that it requires the wireless switch to receive and utilize the SS7, or other type of signaling message, in order to suppress billing for the wireless called party. However, most commonly available wireless switches, sometimes referred to as "mobile switching centers" ("MSCs"), are not equipped to utilize these signaling messages. Unless a specially equipped MSC is used that can utilize SS7 or other signaling messages, the signaling messages will be ignored and the called wireless subscriber will eventually be billed for a call that the calling party was intended to be billed for. Moreover, even if one network includes MSCs that can utilize SS7 messages, if a wireless call spans multiple networks, the MSCs in all the networks must be able to utilize SS7 messages for the system disclosed in the '664 patent to operate properly. This will rarely be the case.

Based on the foregoing, there is a need for a calling party paid wireless telecommunication system that does not require specially equipped MSCs to operate properly.

SUMMARY OF THE INVENTION

One embodiment of the present invention is a telecommunication network for processing a telephone call from a calling party to a called party. The called party uses a wireless telephone that is associated with an MSC and has a MIN. The telecommunication network, responsive to the calling party dialing the MIN, receives the MIN at an originating switch. The network then translates the MIN to an internal routing number and routes the telephone call to a terminating switch based on the internal routing number. The terminating switch is directly connected to the MSC. The network then translates the internal routing number back to the MIN and routes the telephone call to the MSC. After the call is completed, the billing of the called party is suppressed for at least some of the telephone call air time.

DETAILED DESCRIPTION

Figure 1:
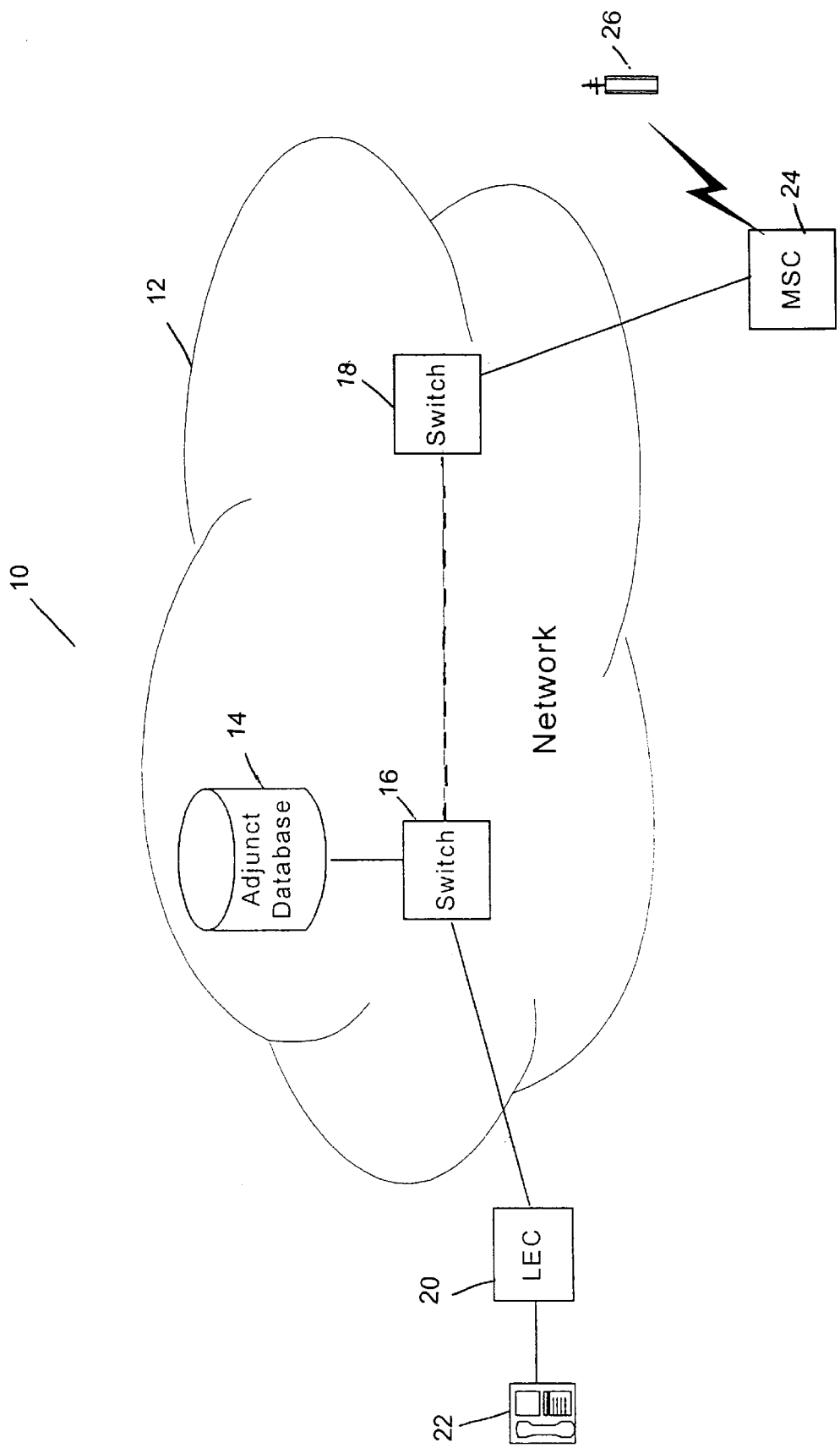
FIG. 1 illustrates a telecommunication system for completing and processing telephone calls to a wireless telephone in accordance with one embodiment of the present invention.

One embodiment of the present invention is a calling party paid wireless telecommunication system that utilizes standard MSCs. FIG. 1 illustrates a telecommunication system 10 for completing and processing telephone calls to a wireless telephone in accordance with one embodiment of the present invention.

A telephone call in system 10 is placed by a calling party from a telephone 22 to a wireless telephone subscriber at a wireless telephone 26. Telephone 22 may be any type of telephone that can be used to initiate a telephone call, including a wireless telephone.

System 10 includes a local exchange carrier ("LEC") switch 20 that couples phone 22 to a network 12. Network 12 is a switched network that can establish a telephone call between telephone 22 and any other telephones coupled to network 12. In one embodiment, network 12 is the AT&T switched long-distance network. Network 12 includes multiple telephone switches. In the embodiment shown in FIG. 1, network 12 includes switches 16 and 18, which in one embodiment are 4ESS switches available from Lucent Technologies Corp. However, network 12 can include any number of additional switches, and switches 16 and 18 can be any type or brand of telephone switches, including 5ESS switches from Lucent Technologies Corp.

MSC 24 serves as a wireless communications facility for wireless telephone 26. MSC 24 is geographically proximate to wireless telephone 26, and may change depending on the geographic location of wireless telephone 26. MSC 24 is directly coupled to switch 18 within network 12. For all telephone calls to wireless telephone 26, switch 18 is the terminating switch and MSC 24 is coupled to the terminating trunk group of switch 18.

Wireless telephone 26 has a MIN that functions as its telephone number. In the present invention, the MIN is the telephone number that is dialed by the calling party to initiate a call to wireless telephone 26. In one embodiment, the MIN for telephone 26 is a special, non-geographic telephone number, such as a number of the form 500-xxxxxx. The non-geographic telephone number directs the call to a specific network that has been assigned the number. In system 10, the non-geographic telephone number, when dialed, automatically directs the call to switch 16 of network 12. Unlike the system disclosed in the '664 patent, wireless telephone 26 has only a single number associated with it (i.e., the non-geographic MIN). The 500 MIN is programmed into wireless telephone 26.

Switch 16 is coupled to an adjunct database 14. Database 14 translates a 500-xxx-xxx MIN (or any type of non-geographic number) into an internal routing number that is assigned to the terminating switch for the MIN. The terminating MSC for the wireless subscriber assigned to the MIN is directly connected to the terminating switch (e.g. switch 18).

Figure 2:
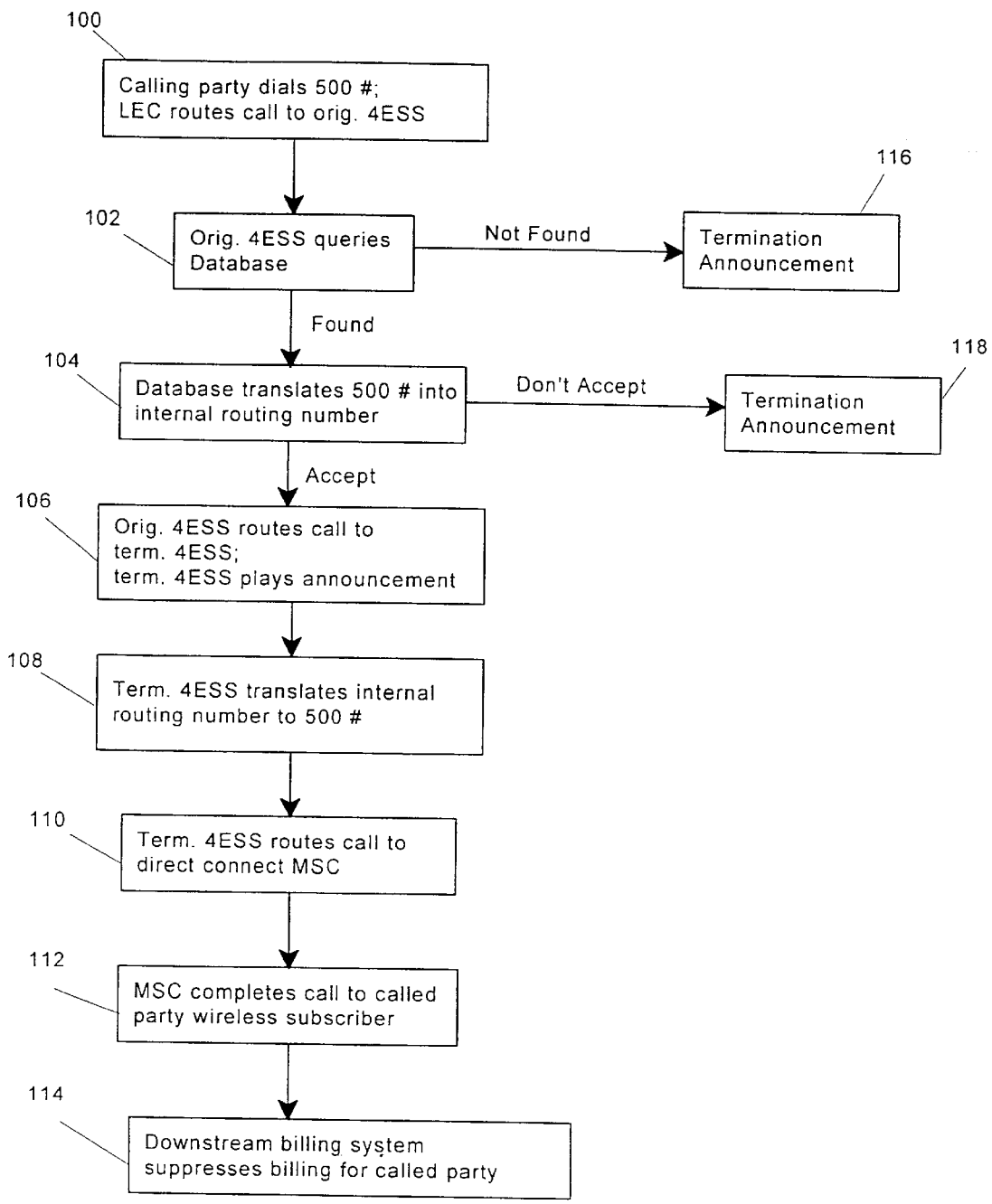
FIG. 2 is a flowchart illustrating the steps performed by the system when processing a telephone call from a calling party at one telephone to a called party at a wireless telephone.

FIG. 2 is a flowchart illustrating the steps performed by system 10 when processing a telephone call from a calling party at telephone 22 to a called party at wireless telephone 26.

At step 100, the calling party originates the telephone call by dialing the MIN telephone number for wireless telephone 26. LEC 20 routes the telephone call to switch 16 within network 12. Switch 16 is the originating switch within network 12 for the telephone call.

At step 102, originating switch 16 queries database 14 based on the MIN. Database 14 attempts to locate in its database the MIN. If at step 102 the MIN is not found by database 14, switch 16 or database 14 plays a termination announcement terminating the telephone call at step 116. If the MIN is found by database 14, system 10 performs step 104.

At step 104, database 14 translates the MIN into an internal routing number. The internal routing number is a non-dialable telephone number that is associated with a single terminating switch within network 12 and is unique for each MIN. In one embodiment, the internal routing number is a ten digit number in which the first six digits identify the terminating switch and the dedicated trunk, and the last four digits identify wireless telephone 26. The terminating switch (i.e., terminating switch 18) is directly connected to the MSC that serves the wireless called party.

After the MIN is translated, either switch 16 or database 14 will play an announcement to the calling party such as:

Your call has been placed to a wireless telephone. If you wish to complete this call, you will be charged an additional 50¢ per minute to cover the cost of the air time charges associated with the call. Please press "1" if you wish to complete this call and accept the charges, or "2" if you wish to terminate this call.

If the calling party refuses to accept the charges for the air time, the calling party receives a termination announcement at step 118, and then hangs up the telephone.

If the calling party accepts the telephone call at step 104, at step 106 originating switch 16 routes the telephone call to terminating switch 18 based on the internal routing number.

At step 108, terminating switch 18 translates the internal routing number back to the MIN that was originally dialed by the calling party.

At step 110, terminating switch 18 routes the telephone call to the directly connected MSC 24 along with the MIN.

At step 112, MSC 24 completes the call to the wireless called party at telephone 26 in a normal manner using the received MIN. Completing the call may include connecting the call to wireless telephone 26, routing the call to a voice mail box if the calling party is not available, or playing a "calling party is not available" announcement if the calling party is not available.

At step 114, MSC 24 creates billing records that reflect that the called telephone number was a 500 number. Based on the billing records, the downstream billing system of the wireless provider of wireless telephone 26 suppresses at least some, if not all, of the air time charges for the telephone call after the telephone call has been terminated. This prevents the called party on wireless telephone 26 from being billed for the wireless air time of the incoming telephone call. The calling party will be billed for the call based on billing records generated by originating switch 16.

As described, the calling party paid system in accordance with the present invention enables the processing of a telephone call to a wireless called party so that air time charges will be paid by the calling party. The MSCs included in the system are standard MSCs that are directly connected to the terminating switch of the telephone call. Further, a single telephone number (i.e., the MIN) is associated with the wireless called party on telephone 26 and all telephone calls to that telephone number are billed on a calling party paid basis.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of processing a telephone call from a calling party to a called party over a network, wherein the called party uses a wireless telephone having a mobile identification number (MIN) and associated with a mobile switching center (MSC), said method comprising:
   (a) responsive to the calling party dialing the MIN, receiving the MIN at an originating switch in the network;
   (b) translating the MIN to an internal routing number;
   (c) routing the telephone call to a terminating switch in the network based on the internal routing number, wherein said terminating switch is directly connected to the MSC;
   (d) translating the internal routing number back to the MIN;
   (e) routing the telephone call to the MSC; and
   (f) suppressing a billing of the called party for at least some of the telephone call air time.

2. The method of claim 1, wherein the MIN is a non-geographic telephone number.

3. The method of claim 1, wherein the MIN is a 500-xxx-xxx telephone number.

4. The method of claim 1, further comprising completing the call from the MSC to the wireless telephone.

5. The method of claim 1, wherein said originating and said terminating switches are 4ESS switches.

6. The method of claim 1, further comprising:
   terminating the telephone call if the MIN cannot be translated into an internal routing number.

7. The method of claim 1, further comprising:
   determining whether the calling party will accept the telephone call.

8. The method of claim 1, wherein the MIN is assigned to the network.

9. A telecommunication system for processing a telephone call from a calling party to a called party, said telecommunication system comprising:
   a network having a terminating switch coupled to an originating switch;

an adjunct database coupled to said originating switch;

a mobile switching center (MSC) directly coupled to said terminating switch; and a wireless telephone programmed with a mobile identification number (MIN) and associated with said MSC, wherein the MIN is dialed by the calling party.

10. The system of claim 9, wherein the MIN is a non-geographic telephone number.

11. The system of claim 10, wherein the MIN is a 500-xxx-xxx telephone number.

12. The system of claim 9, wherein said adjunct database is programmed to translate the MIN to an internal routing number.

13. The system of claim 12, wherein said originating switch is programmed to route the telephone call to the terminating switch based on the internal routing number.

14. The system of claim 13, wherein said terminating switch is programmed to translate the internal routing number back to the MIN and route the telephone call to the MSC.

15. The system of claim 9, wherein said originating and said terminating switches are 4ESS switches.

16. A telecommunication network for processing a telephone call from a calling party to a called party, wherein the called party uses a wireless telephone having a mobile identification number (MIN) and associated with a mobile switching center (MSC), said telecommunication network comprising:

means, responsive to the calling party dialing the MIN, for receiving the MIN at an originating switch;

means for translating the MIN to an internal routing number;

means for routing the telephone call to a terminating switch based on the internal routing number, wherein said terminating switch is directly connected to the MSC;

means for translating the internal routing number back to the MIN;

means for routing the telephone call to the MSC; and means for suppressing a billing of the called party for at least some of the telephone call air time.

17. The telecommunication network of claim 16, wherein the MIN is a non-geographic telephone number.

18. The telecommunication network of claim 17, wherein the MIN is a 500-xxx-xxx telephone number.

19. The telecommunication network of claim 17, further comprising means for completing the call from the MSC to the wireless telephone.

20. The telecommunication network of claim 17, wherein said originating and said terminating switches are 4ESS switches.

21. The telecommunication network of claim 17, further comprising:

means for terminating the telephone call if the MIN cannot be translated into an internal routing number.

22. The telecommunication network of claim 17, further comprising:

means for determining whether the calling party will accept the telephone call.

23. The telecommunication network of claim 17, wherein the MIN is assigned to the network.

* * * * *